United States Patent [19]

McCullough

[11] Patent Number: 5,104,578
[45] Date of Patent: Apr. 14, 1992

[54] EMULSION MINIMIZING CORROSION INHIBITOR FOR NAPHTHA/WATER SYSTEMS

[75] Inventor: T. M. McCullough, Houston, Tex.

[73] Assignee: Betz Laboratories, Inc., Trevose, Pa.

[21] Appl. No.: 733,482

[22] Filed: Jul. 22, 1991

Related U.S. Application Data

[60] Division of Ser. No. 521,286, May 9, 1990, Pat. No. 5,062,992, which is a continuation of Ser. No. 248,465, Sep. 23, 1988, abandoned.

[51] Int. Cl.⁵ .............................................. C23F 11/10
[52] U.S. Cl. ................................... 252/394; 252/396; 252/340; 252/341; 252/344; 422/16; 422/17
[58] Field of Search ............... 252/340, 341, 344, 394, 252/396; 422/16, 17

[56] References Cited

U.S. PATENT DOCUMENTS

| | | | |
|---|---|---|---|
| 2,466,517 | 4/1949 | Blair et al. | 252/8.55 |
| 2,668,100 | 2/1954 | Luvisi | 44/63 |
| 3,629,104 | 12/1971 | Maddox, Jr. | 252/8.55 E |
| 3,758,493 | 11/1973 | Maddox, Jr. | 260/309.6 |
| 3,894,849 | 7/1975 | Polss | 44/66 |
| 4,089,803 | 5/1978 | Bessler | 252/358 X |
| 4,371,447 | 2/1983 | Webb et al. | 252/73 |
| 4,402,857 | 9/1983 | Royle | 252/358 X |
| 4,758,374 | 7/1988 | Durr, Jr. et al. | 252/312 |
| 4,959,160 | 9/1990 | Lake | 210/708 X |
| 5,021,167 | 6/1991 | Braden et al. | 210/708 |

OTHER PUBLICATIONS

The Existence of Imidazoline Corrosion Inhibitors, J. A. Martin and F. W. Valone, Corrosion NACE, vol. 41, pp. 281–287 (May 1985).

"Studies on Anticorrosives' Effect of Imidozoline Compounds Inhibiting Corrosion", T. Babe et al., 1960.

"Synthesis and Properties of Fatty Imidazolines and Their N-(2-Aminoethyl)Derivatives", JOACS, vol. 60, No. 4, Apr. 1983.

*Primary Examiner*—Deborah L. Kyle
*Assistant Examiner*—Valerie Fee
*Attorney, Agent, or Firm*—Alexander D. Ricci; Steven D. Boyd

[57] ABSTRACT

A corrosion inhibitor formulation for oil and water systems which formulation is resistant to sludge formation and does not tend to stabilize oil/water emulsions when added to oil and water systems. The corrosion inhibitor includes an imidazoline dissolved in an aromatic solvent, a 2-hydroxyalkylcarboxylic acid such as glycolic acid and a glycol such as hexylene glycol. The imidazoline is preferably prepared from a long chain fatty acid and a polyamine in a molar ratio of about 1.5:1.

11 Claims, No Drawings

EMULSION MINIMIZING CORROSION INHIBITOR FOR NAPHTHA/WATER SYSTEMS

This is a divisional of application Ser. No. 07/521,286 filed May 9, 1990, now U.S. Pat. No. 5,062,992 which is a continuation of Ser. No. 07/248,465 filed Sep. 23, 1988 now abandoned.

FIELD OF THE INVENTION

The present invention relates to corrosion inhibitors and more particularly to a corrosion inhibitor for naphtha/water systems which minimizes the formation/stability of oil/water emulsions. The corrosion inhibitors of the present invention are resistant to sludge formation upon standing.

BACKGROUND OF THE INVENTION

Corrosion, particularly of ferrous metals, in crude oil producing, collection and refining systems is a significant problem. The adverse effects of corrosion which shorten equipment life and increase downtime have multiplied as the refinery process has expanded and become more complex. Corrosion problems in a refinery operation and in particular a crude oil unit can be the result of any one or a combination of (i) the components found in the crude oil, (ii) the chemicals used in the refinery process, and (iii) the process conditions.

The inhibition of corrosion in oil and natural gas production, collection, refinery and distribution systems has been of great concern in the industry. The use of imidazolines as corrosion inhibitors has been known in the industry. For example, U.S. Pat. No. 3,629,104, Maddox, discloses a water soluble corrosion inhibitor for well fluids which consists of the normal and acid salts of substituted imidazolines and saturated aliphatic mono and dicarboxylic acids. The water soluble imidazoline salts are prepared by forming the imidazolines from a tall oil fatty acid and diethylenetriamine, and neutralizing with a dicarboxylic acid.

Similarly, U.S. Pat. No. 3,758,493, Maddox, discloses a water soluble corrosion inhibitor, particularly for ferrous metals in contact with petroliferous fluids, which comprises normal and acid salts of substituted imidazolines. The imidazolines are prepared by reacting either a tall oil fatty acid or a polymerized carboxylic acid with a polyalkylene polyamine. The imidazolines are then reacted with aliphatic saturated mono or dicarboxylic acid to form the normal and acid salts.

While the prior art use of imidazolines as a corrosion inhibitor has been commercially acceptable, specific problems do exist. For example, imidazolines have a tendency to degrade slowly upon standing to yield a sludge. Such sludge formation has been identified as a ring opening hydrolysis of the imidazoline to yield amides.

The formation of sludge due to degradation of imidazolines can be controlled by the addition of acids such as hydrochloric acid to the imidazoline or by using excess dimer-trimer acids in the preparation of the imidazolines. See J. A. Martin and W. M. Linfield, Journal of American Oil Chemical Society, 60,823-828 (1983). However, when a carboxylic acid stabilized imidazoline is formulated in an aromatic solvent and is added to a system containing naphtha/water, stabilization of the oil/water emulsion results. This is particularly a problem in refinery areas where naphtha is often used as a distillation tower reflux. While recycling of the naphtha is desirable, the water in such an emulsion can often contain corrosive species such as sulfide, ammonia, organic acids and chloride. Thus, the entrainment or emulsification of the naphtha and water can increase operating problems such as corrosion and waste disposal for units such as sour water strippers.

SUMMARY OF THE INVENTION

The present invention relates to an improved corrosion inhibitor, more particularly the present invention relates to an imidazoline based corrosion inhibitor which is resistant to sludge formation and which does not appreciably increase the stability of a naphtha/water emulsion when added to a naphtha/water system. The corrosion inhibitor of the present invention includes an imidazoline preferably prepared from a tall oil fatty acid and a polyamine, dissolved in an organic solvent. The formulation also includes a 2-hydroxyalkylcarboxylic acid having the formula

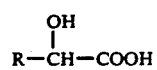

where R is H or an alkyl group of from 1 to 6 carbon atoms; and a glycol having the formula

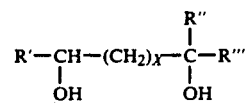

where R', R" and R''' are independently chosen from hydrogen or alkyl groups of from 1 to 4 carbon atoms and X is an integer from 0 to 4, with the provisos that the glycol contain at least 4 carbon atoms, and when X=0 R', R" and R''' are not all hydrogen.

The molar ratio of the tall oil fatty acid and polyamine used to form the imidazoline is preferably about 1.5:1. The mole ratio of the carboxylic acid to imidazoline is preferably from about 0.5:1 to about 1.5:1 and the weight ratio of the carboxylic acid to the glycol is preferably about 1:1.

It is an object of the present invention to provide an improved imidazoline corrosion inhibitor which is resistant to sludge formation. It is a further object of the present invention to provide an imidazoline corrosion inhibitor that has minimal stabilizing effects on emulsions when added to a naphtha/water system. These and other objects and advantages of the present invention will be apparent to those skilled in the art upon reference to the following description of the preferred embodiments.

DESCRIPTION OF THE PREFERRED EMBODIMENTS

In accordance with the present invention an improved corrosion inhibitor formulation is provided which provides corrosion inhibition in naphtha/water systems. The corrosion inhibitor is resistant to sludge formation upon standing. The corrosion inhibitor has a minimal effect on naphtha/water emulsion stabilization when added to a naphtha/water system. The formulation of the present invention includes an imidazoline which is dissolved in an aromatic solvent along with (a) a 2-hydroxyalkylcarboxylic acid and (b) a glycol. The 2-hydroxyalkylcarboxylic acid and glycol may be added either as single components or as a mixture. The 2-hydroxyalkylcarboxylic acid may contain up to about 30 weight % water.

Suitable 2-hydroxyalkylcarboxylic acids include: glycolic acid (2-hydroxyacetic acid), lactic acid (2-hydroxypropionic acid), 2-hydroxybutanoic acid, 2-hydroxypentanoic acid, 2-hydroxyhexanoic acid, 2-hydroxy-2-methylpropanoic acid or mixtures thereof. The preferred 2-hydroxyalkylcarboxylic acid is glycolic acid. The 2-hydroxyalkylcarboxylic acid is added in an amount sufficient to maintain solubility of the imidazoline and minimize effects of the imidazoline on naphtha/water emulsion stabilization when added in combination with a glycol.

Suitable glycols include: hexylene glycol (2-methyl-2-4-pentanediol); 1,2-butanediol; 1,3-butanediol; 1,4-butanediol; 1,6-butanediol; 2,4-pentanediol or mixtures thereof. The preferred glycol is hexylene glycol. The glycol is added in an amount sufficient to maintain solubility of the imidazoline.

The above list of suitable 2-hydroxyalkylcarboxylic acids and glycols are intended to be illustrative only and are not intended to be limiting.

The imidazolines of the present invention are those compounds or mixtures of compounds prepared from long chain fatty acids, such as tall oil fatty acid, stearic acid, or oleic acid, or mixtures thereof and polyamines such as ethylenediamine, diethylene-triamine, triethylenetetramine or tetraethylenepentamine. The imidazoline employed in the following examples was prepared by known methods from tall oil fatty acids and diethylenetriamine with a molar ratio of about 1.5:1. In the preparation of imidazolines, a portion of the product may consist of amides that will not dehydrate to yield the imidazoline.

Suitable aromatic solvents for use in the present invention include aromatic naphthas, toluene, xylene, ethylbenzene and other alkyl substituted aromatic compounds.

The corrosion inhibitor formulation of the present invention is fed to a refinery or petrochemical process which contains an oil, gas and some water which need to be separated and where corrosion would occur if the system were not treated. The formulation may be fed to the system either continuously or intermittently with continuous feed being preferred. Typical refinery and petrochemical processes where the formulation of the present invention would be desirable include: treatment of overhead fractionation towers in depropanizers, debutanizers and depentanizers; fluid catalytic cracking units; main fractioners; and crude towers. The metallurgy of such systems to be protected can include carbon steel, brass, monel and titanium. The formulation is added to such systems in concentrations of from about 1 to about 500 parts formulation to one million parts of the system fluid. Larger concentrations may be employed, depending upon the specific process conditions in the system.

The following examples illustrate the present invention. The examples are intended to be illustrative only and are not intended to limit the scope of the present invention.

EXAMPLE 1

To determine the propensity of the corrosion inhibitor formulation to form sludge upon standing, the following accelerated sludge test was employed. Twenty-eight grams of test material, comprising 25% by weight of the imidazoline in heavy aromatic naphtha, and the additives listed in TABLE I were mixed with 0.3 grams of water and shaken. The shaken mixture was placed in an oven at 150° F. for 18 hours. The mixture was observed for sludge formation then cooled in for 18 a refrigerator at about 45° to 50° F. for 2 hours whereupon the sample was again checked for sludge formation. TABLE I summarizes the results.

TABLE I

| | Sludge After | |
|---|---|---|
| Additive(s) | Heating | Cooling |
| None | None | Sludge |
| Propionic Acid (5.2%), Nonanoic Acid (2.3%) | None | None |
| Glycolic Acid (6.5%) | Sludge | Sludge |
| Glycolic Acid (6.5%), Ethylene Glycol (5%) | Sludge | Sludge |
| Glycolic Acid (6.5%), Hexylene Glycol (5%) | None | None |
| Glycolic Acid (6.5%), Hexylene Glycol (10%) | None | None |

The glycolic acid used was a 70% solution in water.

From the data summarized in TABLE I, it is shown that either monoalkylcarboxylic acids such as propionic and nonanoic acid, or 2-hydroxycarboxylic acids, such as glycolic acid, with an appropriate glycol yield formulations resistant to sludge formation.

EXAMPLE 2

To determine the effects of the corrosion inhibitor formulation on oil/water emulsions when added to an oil/water system, the following emulsion breaking test was undertaken. In a 6 ounce glass bottle was placed 90 milliliters of naphtha, 10 milliliters of water, and 10 parts per million of the 25% by weight imidazoline salt formulation. The mixture was shaken 25 times by hand at room temperature and the time, in seconds, to breaking of the naphtha/water emulsion recorded. The mixture was then heated to 100° F. and reagitated and the time to breaking of the emulsion recorded. The test was then repeated at 120° F. for both the initial agitation and reagitation. The results from Example 2 are summarized in Table II.

TABLE II

Results of Emulsion Breaking Test with Synthetic Naphtha

| Additive(s)[a] | Break Time (Seconds) | |
|---|---|---|
| | Ambient Temp. 25 Shakes | 100° F. Reagitation |
| None | 8 | 5–6 |
| Imidazoline | >8 | 40–45 |
| Imidazoline, Propionic Acid, Nonanoic Acid | >8 | 40–45 |
| Imidazoline, Glycolic Acid, Hexylene Glycol | >8 | 9 |
| | 120° F. 25 Shakes | 120° F. Reagitation |
| None | 5 | 9 |
| Imidazoline | 22 | 37 |
| Imidazoline, Propionic Acid, Nonanoic Acid | 22 | 43 |
| Imidazoline, Glycolic Acid, Hexylene Glycol | 15 | 26 |

[a] Imidazoline as defined herein above.

EXAMPLE 3

The procedure of Example 2 was followed with the exception that the ratio of naphtha to water was changed to 95:5 and only the initial emulsion break time at 120° F. was recorded. The results of Example 3 are summarized in TABLE III.

TABLE III

Results of Emulsion Breaking Test With a Refinery Naphtha (Ratio of Naphtha:Water, 95:5)

| Additive(s)[a] | Break Time (Seconds) 120° F. 25 Shakes |
|---|---|
| None | 5 |
| Imidazoline, Propionic Acid, Nonionic Acid | 180 |
| Imidazoline, Glycolic Acid, Hexylene Glycol | 60 |

[a] Imidazoline as defined herein above.

From TABLES II and III, it can be seen that of the non-sludge forming formulations of Example 1, glycolic acid with hexylene glycol forms a less stable emulsion than the monoalkyl-carboxylic acid formulation. That is the corrosion inhibitor formulation including a imidazoline, glycolic acid and hexylene glycol was resistant to sludge formation upon standing and further had only minimal emulsion stabilizing effect when added to an oil/water system. By minimal stabilizing effect on emulsion stability, it is meant that the corrosion inhibiting formulation of the present invention has a significantly lower stabilizing effect as evidenced by much shorter emulsion break times when added to an oil/water mixture than imidazoline corrosion inhibitor formulations outside the scope of the present invention. This is exemplified by the results shown in Tables II and III.

EXAMPLE 4

To determine the corrosion inhibition efficacy of the monoalkylcarboxylic acids and glycolic acid, hexylene glycol formulations were employed in a sour, deoxygenated test. A sour brine solution was prepared by dissolving 132 grams of ammonium chloride in 4 liters of distilled water, purging the solution for 2 hours with oxygen-free nitrogen with stirring and, under oxygen-free nitrogen adding 14.5 milliliters of a 22 weight % aqueous solution of ammonium sulfide and 8 milliliters of a glacial acetic acid.

To 8 ounce polypropylene bottles, under oxygen-free nitrogen purge were added 225 milliliters of the sour brine solution, 25 milliliters of deodorized kerosene, the treatment additives listed in TABLE IV, and a pre-weighed mild steel coupon abraded with a non-metallic pad to yield a clean metallic surface. The bottles were capped, shaken and placed on a wheel turning at 22.8 rpm in an oven at 150° F. for 18 to 21 hours. The coupons were removed, dipped in inhibited hydrochloric acid, scurbbed clean and weighed to determine the amount of corrosion. The results are summarized in TABLE IV.

TABLE IV

Results of Corrosion Efficacy Test for Imidazoline Formulations

| Additive(s)[a] | ppms (Actives) | Number of Runs Averaged | Ave. % Protection |
|---|---|---|---|
| Imidazoline | 1.0 | 14 | 15 |
| Imidazoline, Propionic Acid, Nonanoic Acid | 1.0 | 3 | 14 |
| Imidazoline, Glycolic Acid, Hexlene Glycol | 1.0 | 9 | 12 |
| Imidazoline | 1.5 | 14 | 64 |
| Imidazoline, Propionic Acid, Nonanoic Acid | 1.5 | 3 | 89 |
| Imidazoline, Glycolic Acid, Hexylene Glycol | 1.5 | 12 | 66 |
| Imidazoline | 2.0 | 9 | 90 |
| Imidazoline, Propionic Acid, Nonanoic Acid | 2.0 | 3 | 88 |
| Imidazoline, Glycolic Acid, Hexlene Glycol | 2.0 | 9 | 87 |
| Imidazoline | 3.0 | 3 | 92 |
| Imidazoline, Propionic Acid, Nonanoic Acid | 3.0 | 3 | 94 |
| Imidazoline, Glycolic Acid, Hexylene Glycol | 3.0 | 3 | 89 |
| Imidazoline | 4.0 | 3 | 94 |
| Imidazoline, Propionic Acid, Nonanoic Acid | 4.0 | 3 | 93 |
| Imidazoline, Glycolic Acid, Hexylene Glycol | 4.0 | 3 | 89 |

[a] Imidazoline as defined herein above.

Based upon the data in TABLE IV, all three formulations are equally effective as corrosion inhibitors.

As shown by the results of Examples I through IV, the present invention of a 2-hydroxyalkylcarboxylic acid and a glycol in combination with an imidazoline dissolved in heavy aromatic naphtha provides an improved corrosion inhibitor which has a minimal effect on emulsification when added to an oil/water mixture, and which corrosion inhibitor is non-sludging upon standing.

While the present invention has been described with respect to particular embodiments thereof, it is apparent that numerous other forms and modifications of this invention will be obvious to those skilled in the art. The appended claims and this invention should be construed to cover all such obvious forms and modifications which are within the true spirit and scope of the present invention.

What is claimed is:

1. A method of inhibiting corrosion in an oil and water system which comprises adding to said system an effective amount of a formulation comprising:

(a) an imidazoline dissolved in a hydrocarbon solvent;

(b) an effective amount of a 2-hydroxyalkylcarboxylic acid having the formula

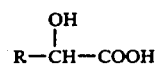

where R is H or an alkyl group of from 1 to 6 carbon atoms; and (c) an effective amount of a glycol having the formula

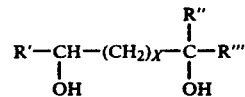

where R', R" and R'" are independently, hydrogen or an alkyl group of from 1 to 4 carbon atoms, X is an integer from 0 to 4 and wherein when X=0, R' R", and R'" are not all hydrogen, with said glycol having at least 4 carbon atoms, wherein said formulation is resistant to sludge formation and said formulation has an effect on oil/water emulsion stability less than imidazoline alone when added to an oil/water solution.

2. The method of claim 1, wherein said imidazoline is prepared from a long chain fatty acid and a polyamine in a molar ratio of about 1.5:1.

3. The method of claim 2, wherein said long chain fatty acid is selected from the group consisting of tall oil fatty acid, stearic acid, oleic acid and mixtures thereof.

4. The method of claim 2, wherein said polyamine is selected from the group consisting of ethylenediamine, diethylenetriamine, triethylenetetramine and tetraethylenepentamine.

5. The method of claim 1, wherein said 2-hydroxyalkylcarboxylic acid is selected from the group consisting of glycolic acid, lactic acid, 2-hydroxybutanoic acid, 2-hydroxypentanoic acid, 2-hydroxyhexanoic acid, 2-hydroxy-2-methylpropanoic acid and mixtures thereof.

6. The method of claim 1, wherein said glycol is selected from the group consisting of hexylene glycol, 1,2-butanediol, 1,3-butanediol, 1,4-butanediol, 1,6-hexanediol, 2,4-pentanediol and mixtures thereof.

7. The method of claim 1, wherein said solvent is selected from the group consisting of aromatic naphtha, toluene, xylene and ethylbenzene.

8. The method of claim 1, wherein the mole ratio of said 2-hydroxyalkylcarboxylic acid to said imidazoline is from about 0.5:1 to about 1.5:1.

9. The method of claim 8, wherein said mole ratio is about 1:1.

10. The method of claim 1, wherein the weight ratio of said 2-hydroxyalkylcarboxylic acid to said diol is from about 2:1 to about 1:2.

11. The method of claim 10, wherein said weight ratio is about 1:1.

* * * * *